(12) United States Patent
Tu

(10) Patent No.: US 9,914,499 B2
(45) Date of Patent: Mar. 13, 2018

(54) HOUSING STRUCTURE

(71) Applicant: GOGORO INC., George Town (KY)

(72) Inventor: Hsing Lei Tu, Guishan Township (TW)

(73) Assignee: Gogoro Inc., Hong Kong (CN)

( * ) Notice: Subject to any disclaimer, the term of this patent is extended or adjusted under 35 U.S.C. 154(b) by 88 days.

(21) Appl. No.: 14/947,580

(22) Filed: Nov. 20, 2015

(65) Prior Publication Data

US 2016/0159425 A1   Jun. 9, 2016

Related U.S. Application Data

(60) Provisional application No. 62/087,174, filed on Dec. 3, 2014.

(51) Int. Cl.
| | |
|---|---|
| B62K 11/02 | (2006.01) |
| B62J 1/08 | (2006.01) |
| B62K 5/06 | (2006.01) |
| B62K 21/12 | (2006.01) |
| B62J 17/02 | (2006.01) |
| B62J 25/00 | (2006.01) |
| B62K 11/10 | (2006.01) |

(52) U.S. Cl.
CPC ............... *B62K 11/02* (2013.01); *B62J 1/08* (2013.01); *B62J 17/02* (2013.01); *B62J 25/00* (2013.01); *B62K 5/06* (2013.01); *B62K 11/10* (2013.01); *B62K 21/12* (2013.01); *B62K 2202/00* (2013.01)

(58) Field of Classification Search
CPC ........ B62K 11/02; B62K 11/10; B62K 21/12; B62K 5/06; B62K 2202/00; B62J 17/02; B62J 25/00; B62J 1/08
USPC .............. 296/181.1, 181.2; 280/288.2, 288.3
See application file for complete search history.

(56) References Cited

U.S. PATENT DOCUMENTS

| | | | | |
|---|---|---|---|---|
| 7,210,550 B2 * | 5/2007 | Yonehana | ................. | B60L 7/12 180/220 |
| 2010/0078251 A1 * | 4/2010 | Nishiura | ................. | B60L 11/18 180/229 |
| 2013/0284527 A1 * | 10/2013 | Murakami | ................ | B60L 7/18 180/55 |

FOREIGN PATENT DOCUMENTS

| | | |
|---|---|---|
| CN | 1229746 | 9/1999 |
| JP | 6-219361 | 9/1994 |

* cited by examiner

*Primary Examiner* — Jason S Morrow
*Assistant Examiner* — E Turner Hicks
(74) *Attorney, Agent, or Firm* — Perkins Coie LLP

(57) ABSTRACT

A housing structure for forming a body of a vehicle is provided. The housing structure comprises a lower portion and an upper portion. The lower portion has a plate-like central part, a front end, a rear end, and a first bonding part formed on each of the lateral sides of the plate-like central part. The upper portion comprises a central part and a front part. The central part has a first end, a second end, and a second bonding part formed on each of the lateral sides of the central part. By fixing the first bonding part and the second bonding part together, the lower and upper portions are adapted to form the body of the vehicle.

16 Claims, 18 Drawing Sheets

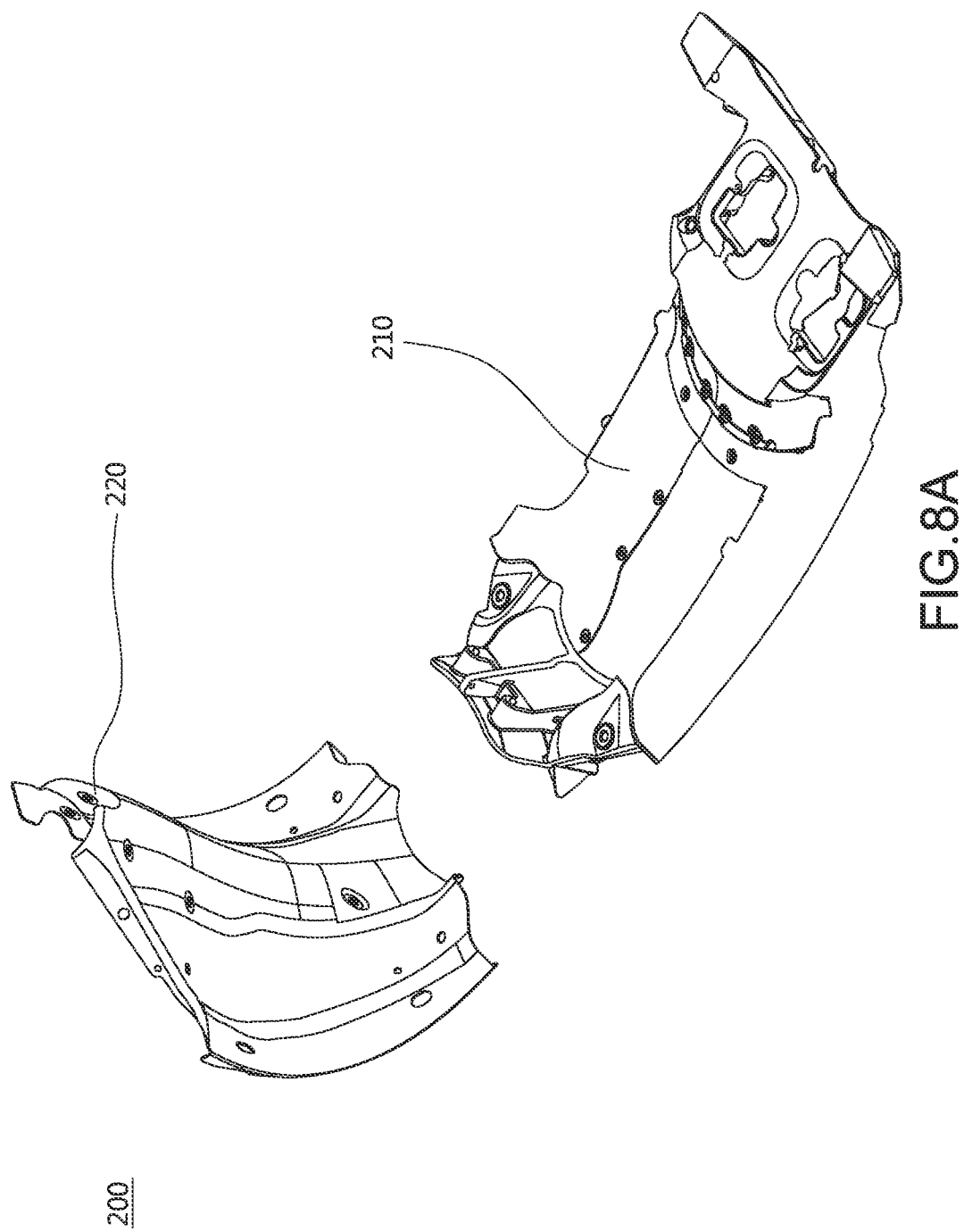

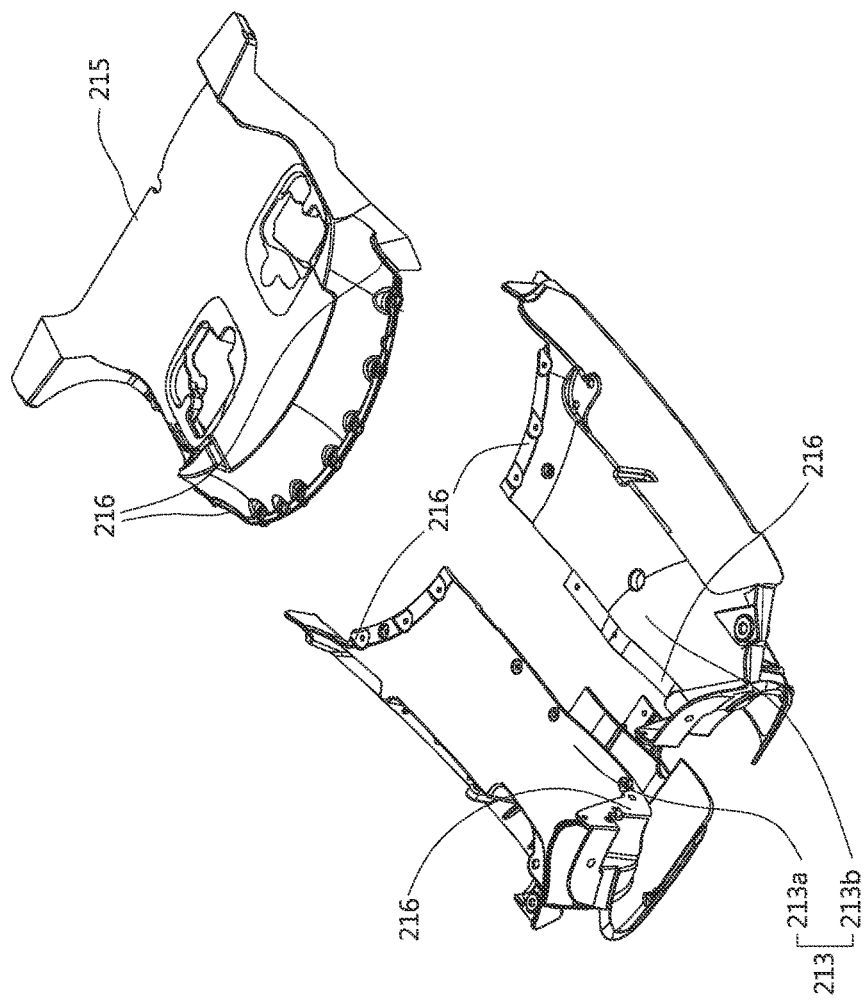

HOUSING STRUCTURE

CROSS-REFERENCE TO RELATED APPLICATIONS

This non-provisional application claims the benefit of provisional application 62/087,174, filed on Dec. 3, 2014, and entitled "HOUSING STRUCTURE," the entirety of which is hereby incorporated by reference.

TECHNICAL FIELD

The present disclosure relates to a housing structure, and more particularly, to a housing structure adapted to form a body of a vehicle.

DESCRIPTIONS OF THE RELATED ART

Vehicles such as motorcycles and tricycles have better maneuverability and are easier to maintain than cars, so use of such vehicles becomes a favorite of many commuters. The trend of using motorcycles in place of cars as commuting tools is significant particularly in densely populated areas such as metropolitan areas.

However, albeit of the advantages such as better maneuverability and easier to maintain, most of the aforesaid vehicles including motorcycles still use gasoline as a source of power, so the oil consumption is still a great economical concern for the riders. In addition to the operation efficiency of the engine, what is closely related to the oil consumption is the weight of the body of the vehicle.

For the aforesaid vehicles such as motorcycles or tricycles, the body (i.e., the vehicle body structure) thereof is mostly formed by welding or bending a plurality of iron pipes into a vehicle frame and covering the vehicle frame with a plastic or metal vehicle housing, so the body of the vehicles has a structure with considerable strength. However, although such a construction imparts the body a considerable strength against potential impacts that might be experienced by the vehicle during the riding process, this adds to the weight of the body, which has an adverse effect on the oil consumption performance of the vehicles.

Accordingly, an urgent need exists in the art to provide a housing structure adapted to form a body of a vehicle that can effectively reduce the weight of the body while still maintaining the strength of the body.

BRIEF DESCRIPTION OF THE DRAWINGS

FIG. 8A and FIG. 8B are a perspective views of an upper portion of the housing structure according to exemplary embodiments of the present disclosure;

FIG. 9A and FIG. 9B are schematic views illustrating the formation of a central part of an upper portion of the housing structure according to an exemplary embodiment of the present disclosure;

DETAILED DESCRIPTION

Figure 1:
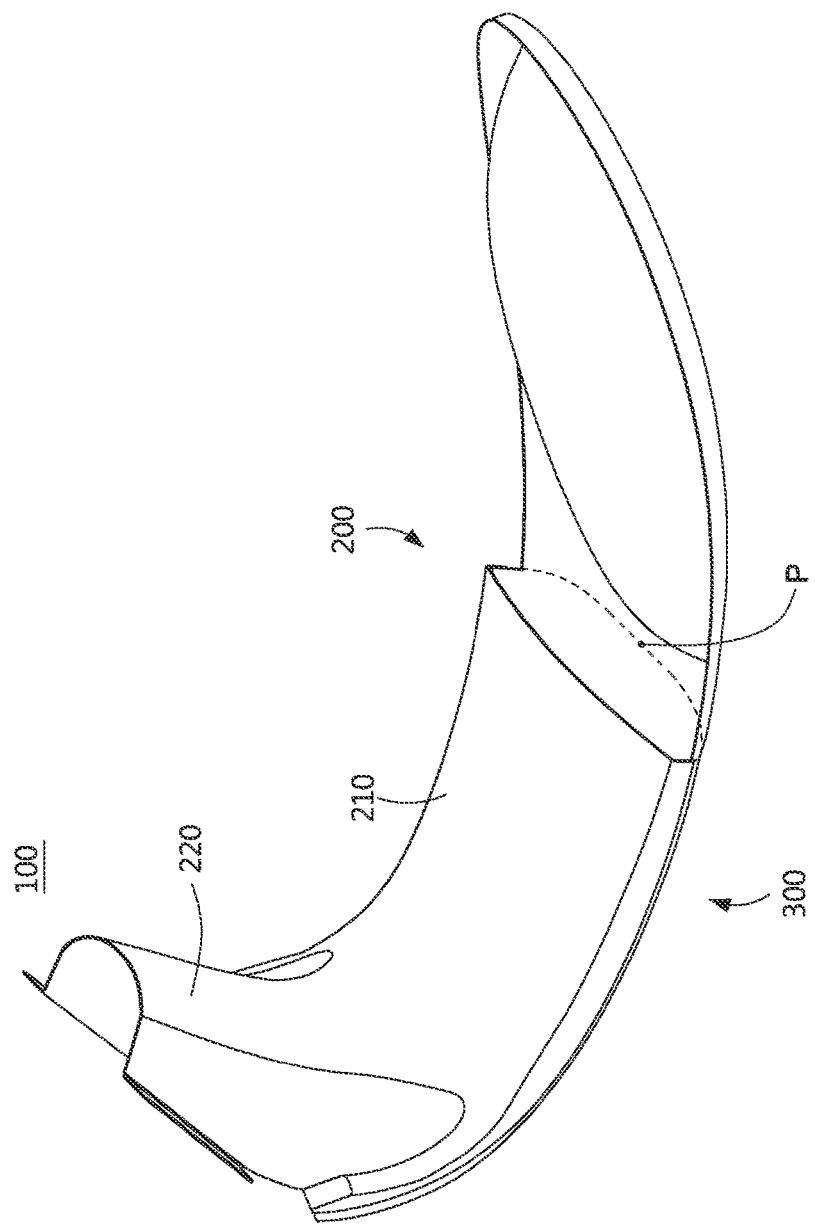
FIG. 1 is a perspective view of a housing structure according to an exemplary embodiment of the present disclosure.

An objective of the present disclosure is to provide a housing structure adapted to form a body of a vehicle. The housing structure is formed by only a lower portion and an upper portion that are fixedly attached together, so that the weight of the body is effectively reduced.

Another objective of the present disclosure is to provide a housing structure adapted to form a body of a vehicle. The housing structure has an enclosed space or a chamber, so that the strength of the body is effectively improved.

To achieve the aforesaid objectives, a housing structure disclosed in the present disclosure comprises a lower portion and an upper portion. The lower portion has a plate-like central part, a front end, a rear end, and a first bonding part. The front end of the lower portion extends from one end of the central part slightly along a direction perpendicular to the normal direction of the central part. The rear end of the lower portion extends from an opposite end of the central part slightly along a direction perpendicular to the normal direction of the central part. The first bonding part is formed on each of the lateral sides of the central part. The upper portion comprises a central part and a front part. The central part has a first end, a second end, and a second bonding part formed on each of the lateral sides of the central part, the second end being opposite to the first end. The central part extends from the first end to the second end. The front part is disposed adjacent to the first end of the central part, and corresponds to the front end of the lower portion. The body of the vehicle is formed by fixedly attaching the first bonding part of the central part of the lower portion and the second bonding part of the central part of the upper portion together.

In one embodiment of the present disclosure, the housing structure further comprises an adhesive, and the adhesive is adapted to fill in between the first and second bonding parts when the lower portion and the upper portion are attached together.

In one embodiment of the present disclosure, the lower portion and the upper portion of the housing structure are made of a material selected from a group consisting of aluminum (Al) and alloys thereof.

In certain embodiments, the vehicle is a two-wheeled vehicle or a tricycle vehicle.

In one preferred embodiment of the present disclosure, the front part of the upper portion is adapted to receive a handle bar structure of the vehicle.

In another embodiment, the upper portion further comprises a rear part. The rear part is disposed opposite to the front part and adjacent to the second end of the central part of the upper portion. The rear part is adapted to receive a seat cushion structure of the vehicle.

In certain embodiments of the present disclosure, the front part and central part of the upper portion are formed separately and then bonded together into the upper portion. The front part and central part of the upper portion may be bonded together by an adhesive, a rivet, a screw, or a combination thereof, but the present disclosure is not limited to such embodiments.

In certain embodiments of the present disclosure, the central part of the upper portion itself is formed by bonding two or more pieces together. In some embodiments, the central part of the upper portion comprises two front pieces and is formed by bonding the two front pieces together. According to one embodiment of the present disclosure, the central part further comprises a rear piece and is formed by bonding the two front pieces and the rear piece together. The two or more pieces of the central part of the upper portion may be bonded together by an adhesive, a rivet, a screw, or a combination thereof, but the present disclosure is not limited to such embodiments.

The detailed technology and preferred embodiments implemented for the subject invention are described in the following paragraphs accompanying the appended drawings for people skilled in this field to well appreciate the features of the claimed invention.

In the following description, the present disclosure will be explained with reference to embodiments thereof. However, description of these embodiments is only for purpose of illustration rather than to limit the present disclosure. It should be appreciated that, in the following embodiments and the attached drawings, elements unrelated to the present disclosure are omitted from depiction; and the numbers of, dimensions of and positional relationships among individual elements in the attached drawings are illustrated only for ease of understanding, but not to limit the actual numbers, scales and dimensions of the elements.

FIG. 1 is a perspective view of a housing structure according to an exemplary embodiment of the present disclosure, wherein the housing structure 100 is adapted to form a body of a vehicle. The vehicle is a two-wheeled vehicle in this embodiment, although the disclosure is not merely limited thereto. For example, in another embodiment of the present disclosure, the housing structure 100 is applicable for a tricycle vehicle or a vehicle with more wheels.

As shown in FIG. 1, the housing structure 100 comprises an upper portion 200 disposed at the upper side of the vehicle and a lower portion 300 disposed at the lower side of the vehicle. In some embodiments, the upper portion 200 is supported by the lower portion 300. In some embodiments, the upper portion 200 is disposed on or above the lower portion 300. In some embodiments, the upper portion 200 is disposed partially above the lower portion 300. In some embodiments, the upper portion 200 is disposed entirely above the lower portion 300. In some embodiments, the upper portion 200 partially defines a step through space between a handlebar area and a seat of the vehicle. In some embodiments, the upper portion 200 at least has a section forming or located below a substantially horizontal or flat feet resting area.

Figure 4:
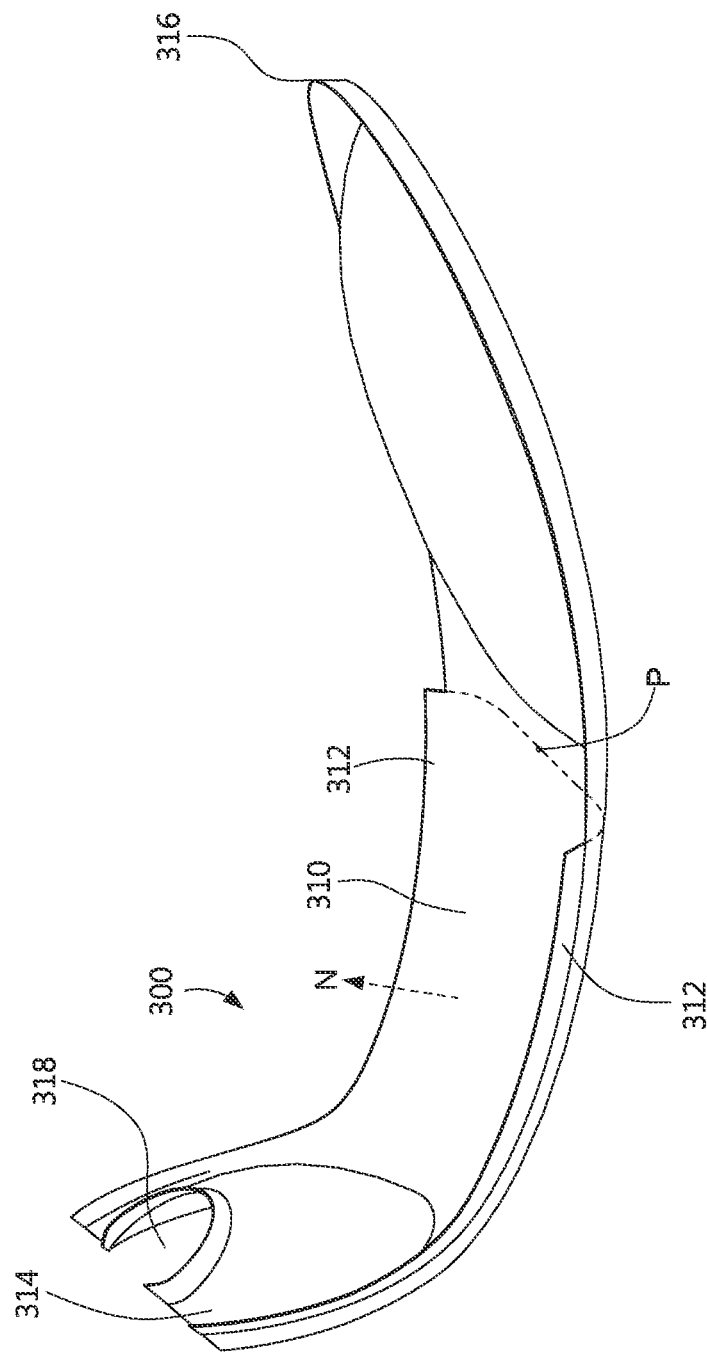
FIG. 4 is a perspective view of a lower portion of the housing structure according to an exemplary embodiment of the present disclosure.

FIG. 4 is a perspective view of a lower portion of the housing structure according to an exemplary embodiment of the present disclosure. Referring to FIG. 4, the lower portion 300, which may form at least a portion of the bottom of the vehicle, includes a plate-like central part 310, a front end 314, a rear end 316, and a first bonding part 312. The front end 314 extends from one end of the plate-like central part 310 slightly along a direction perpendicular to the normal direction N of the plate-like central part 310. The rear end 316 extends from an opposite end of the plate-like central part 310 slightly along a direction perpendicular to the normal direction N of the plate-like central part 310. The first bonding part 312 is formed on each of the lateral sides of the plate-like central part 310. In some embodiments, the front end 314 comprises a curved surface, which is formed to allow the lower portion 300 to not interfere with a front wheel cover of the vehicle. In some embodiments, the central part 310 may extend below a feet resting area of the vehicle. In some embodiments, the lower portion 300 extends below a seat cushion of the vehicle. In some embodiments, the lower portion 300 extends below a compartment that is formed with sufficient space to receive an object such as helmet. In some embodiments, the lower portion 300 extends below a compartment for receiving a battery. In some embodiments, the lower portion 300 is formed from a plate or sheet material. In some embodiments, the lower portion 300 may comprise stamped metal frame.

Figure 2:
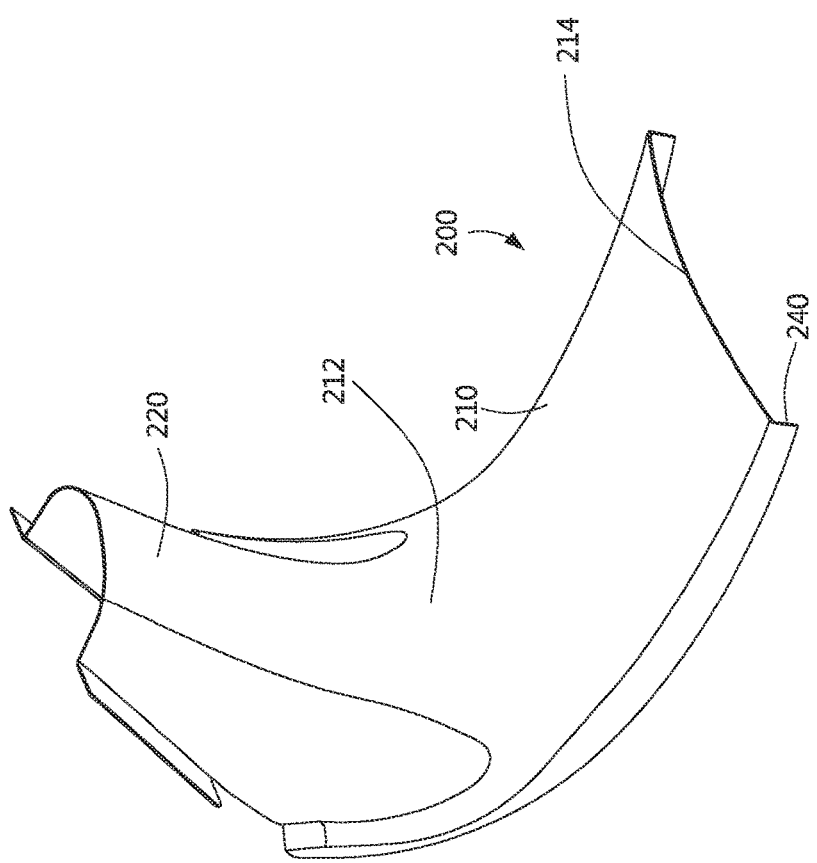
FIG. 2 is a perspective view of an upper portion of the housing structure according to an exemplary embodiment of the present disclosure.
Figure 3:
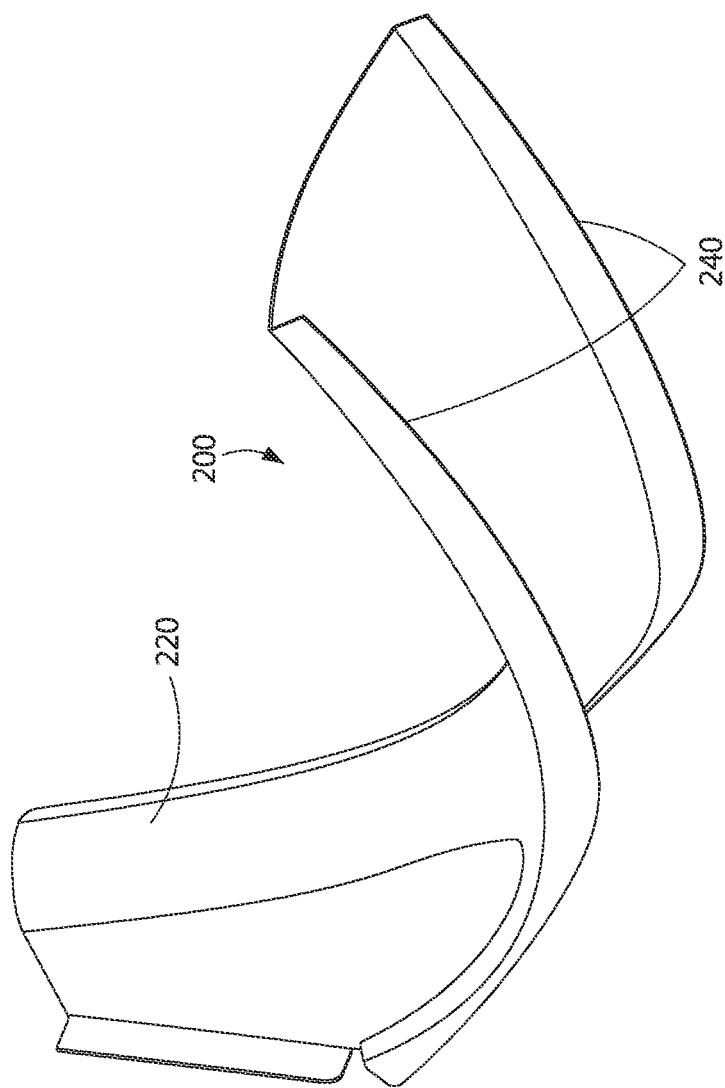
FIG. 3 is a perspective view of the upper portion of the housing structure from another viewing angle according to an exemplary embodiment of the present disclosure.

FIG. 3 is a perspective view of the upper portion of the housing structure according to an exemplary embodiment of the present disclosure from another viewing angle. Referring to FIG. 2 and FIG. 3 together, the upper portion 200 includes a central part 210, a front part 220, and a second bonding part 240 corresponding to the first bonding part 312 of the lower portion 300. The central part 210 has a first end 212, and a second end 214 opposite to the first end 212. The central part 210 of the upper portion 200 extends from the first end 212 to the second end 214. The second bonding part 240 is formed at least at each of the two lateral sides (i.e., the sides other than those of the first and second ends 212, 214) of the central part 210. Namely, the second bonding part 240 is formed at each of the lateral sides of the upper portion 200 and extends at least from the first end 212 to the second end 214. More specifically, to achieve desired structural strength, the first bonding parts 312 and the second bonding parts 240 extend at least around a pivot point P (shown in FIG. 4) where a rear wheel system of the vehicle is connected to the body of the vehicle. FIG. 4 is a perspective view of a lower portion of the housing structure according to an exemplary embodiment of the present disclosure. In the present embodiment, a pivot point P (shown in FIG. 4) is indicated on the lower portion 300. However, the pivot point may also locate on a rear mount disposed between the lower portion 300 and the upper portion 200. The rear mount may be a substantially solid mount fixedly installed in the chamber formed between the lower portion 300 and the upper portion 200, and a rear wheel system of the vehicle may be pivotably linked to the rear mount at a pivot point thereon. Such arrangement can provide stronger support for the rear wheel system. The front part 220 of the upper portion 200 is disposed adjacent to the first end 212 of the central part 210. In this embodiment, the front part 220 is adapted to receive a handle bar structure of the vehicle. As shown in FIGS. 2 and 3, the front part 200 may form a recessed structure for receiving a handle bar structure of the vehicle. Referring to FIG. 4 again, the lower portion 300 may further comprise a through hole 318 formed at the front end 314. A handle bar structure or a fork structure of the two-wheeled vehicle or the tricycle vehicle could be adapted to pass through the through hole 318.

Therefore, once the second bonding part 240 and the first bonding part 312 are fixed together, the upper portion 200 and the lower portion 300 can be bonded together to form the body of the vehicle as shown in FIG. 1.

Figure 5A:
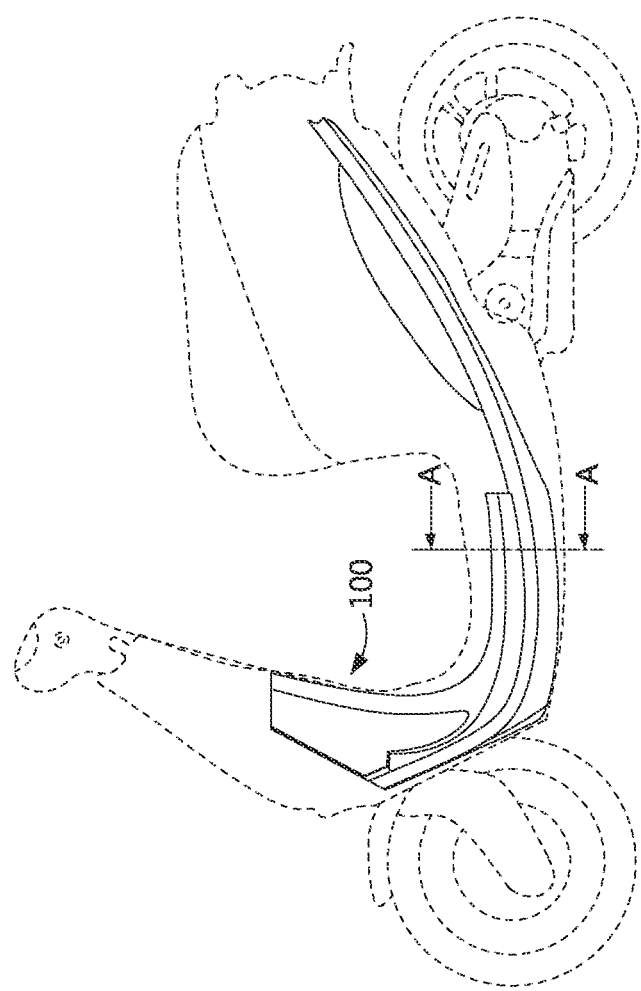
FIG. 5A is a schematic view illustrating the relationship of a chamber of the housing structure, the housing structure, and the two-wheeled vehicle according to an exemplary embodiment of the present disclosure.
Figure 5B:
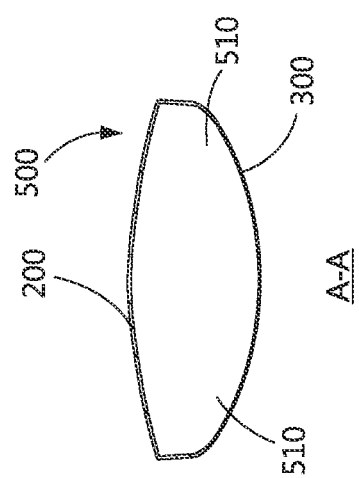
FIG. 5B is a schematic view illustrating a chamber of the housing structure according to an exemplary embodiment of the present disclosure.

By bonding the second bonding part 240 of the upper portion 200 with the first bonding part 312 of the lower portion 300, a chamber is formed between the central part 210 of the upper portion 200 and the central part 310 of the upper portion 300, e.g., the chamber 500 shown in FIG. 5B. Accordingly, the chamber 500 and the housing structure 100 of the present disclosure can replace the vehicle frames of conventional vehicles (e.g., the iron pipes used in motorcycles) to provide desired strength and support.

FIG. 5A is a schematic view illustrating the relationship of a chamber of the housing structure, the housing structure and the two-wheeled vehicle according to an exemplary embodiment of the present disclosure, and FIG. 5B is a schematic view illustrating a chamber of the housing structure according to an exemplary embodiment of the present disclosure. Referring to FIG. 5A, viewing the vehicle as a whole, the housing structure 100 forms the base of the vehicle by which the front wheel system and rear wheel system of the vehicle could be connected. Referring to FIG. 1 together with FIG. 5A, the central part 210 of the upper portion 200 may correspond to a feet resting part or area of the vehicle allowing a user to put his or her feet thereon when he or she is operating the vehicle. Referring to FIG. 5B showing a cross-sectional view taken along line A-A of FIG. 5A, chamber 500 is formed between the upper portion 200 and the lower portion 300. As can be readily appreciated by those of ordinary skill in the art, the aforesaid chamber 500 will accordingly have a receiving space 510 which is able to receive essential vehicular electronic components, a motor cooling system and/or a rear mount structure connecting to the rear wheel system, to guide airflow, or to provide wiring space for internal circuits, but the disclosure is not limited thereto.

Figure 6A:
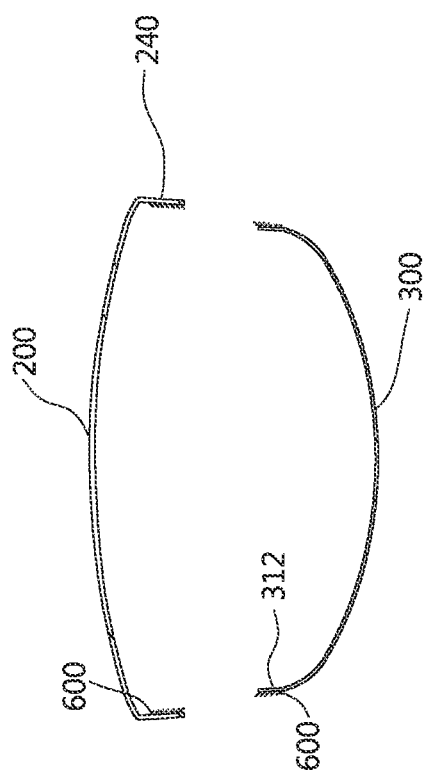
FIGS. 6A-6C are schematic views illustrating the chamber, which are applied with adhesive respectively, of the housing structure according to exemplary embodiments of the present disclosure.
Figure 6B:
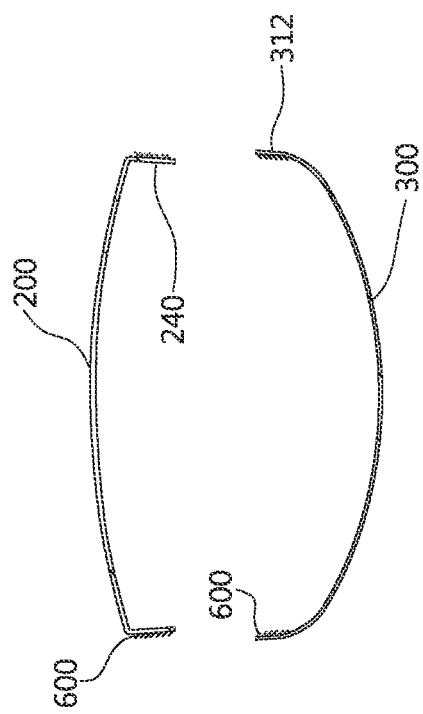
Figure 6C:
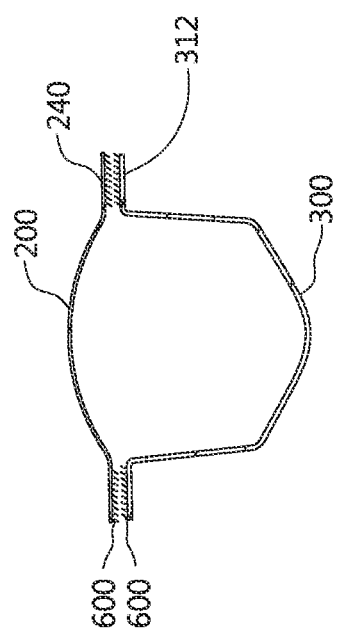
Figure 7:
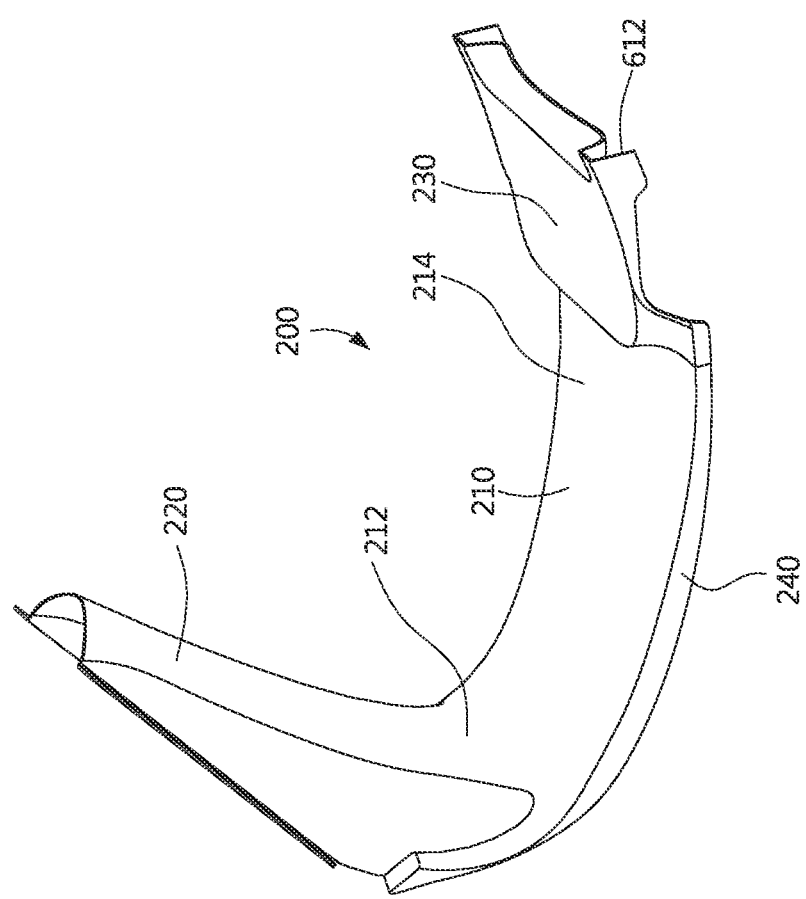
FIG. 7 is a perspective view of an upper portion of the housing structure according to an exemplary embodiment of the present disclosure.

In one preferred embodiment of the present disclosure, the second bonding part 240 (as shown in FIG. 7) of the upper portion 200 and the first bonding part 312 of the lower portion 300 are bonded by being attached together. FIGS. 6A-6C are schematic views illustrating the chamber, which are applied with adhesive, of the housing structure according to an exemplary embodiment of the present disclosure. Referring to FIGS. 6A-6C, to bond the upper portion 200 and the lower portion 300 together, an adhesive may be applied on the second bonding part 240 (as shown in FIG. 7) or the first bonding part 312 (as shown in FIG. 4) to fix the second bonding part 240 and the first bonding part 312. As shown in FIGS. 6A-6C, an adhesive 600 may be applied on the second bonding part 240 and the first bonding part 312 in several manners. For examples, in the case that the second bonding part 240 and the first bonding part 312 respectively extends from the upper portion 200 and lower portion 300 in a direction slightly parallel to the normal direction of the central part of the lower portion 300 (as shown in FIGS. 6A and 6B), the adhesive 600 may be applied on an inner side (with respect to the chamber 500 as shown in FIG. 5B) of the second bonding part 240 and on an outer side of the first bonding part 312 (as shown in FIG. 6A), or the adhesive 600 may be applied on an outer side of the second bonding part 240 and on an inner side of the first bonding part 312 (as shown in FIG. 6B); and in the case that the second bonding part 240 and the first bonding part 312 respectively extends from the upper portion 200 and lower portion 300 in a direction slightly perpendicular to the normal direction of the central part of the lower portion 300 (as shown in FIG. 6C), the adhesive 600 may be applied on an lower side of the second bonding part 240 and on an upper side of the first bonding part 312 (as shown in FIG. 6C).

In another embodiment of the present disclosure, the upper portion 200 may further comprise a rear part adapted to receive a seat cushion structure of the vehicle. FIG. 7 is a perspective view of an upper portion of the housing structure according to an exemplary embodiment of the present disclosure. As shown in FIG. 7, provided is an upper portion 200, which includes a central part 210, a front part 220, and a rear part 230. The central part 210 has a first end 212 and a second end 214 opposite to the first end 212. The central part 210 extends from the first end 212 to the second end 214. The front part 220 is disposed adjacent to the first end 212 of the central part 210. The rear part 230 is disposed opposite to the front part 220 and adjacent to the second end 214 of the central part 210 of the lower portion 200.

It is revealed by experimental data that, as compared with the conventional housing structure where the vehicle frame is formed by a plurality of iron pipes, the deformation amount (which means the amount of temporary elastic deformation herein) of the front part 220 of the upper portion 200 ranges between 37.83% and 92.37% of that of the conventional housing structure when different external forces are applied to the front part 220 of the upper portion 200 during the riding process of the vehicle with the housing structure 100 of the present disclosure. In other words, under the action of the same external force, the housing structure 100 of this application will experience less deformation compared to the conventional housing structure, so the strength of the housing structure 100 of the present disclosure is obviously higher than that of the housing structure of the conventional vehicle frame.

Figure 8B:
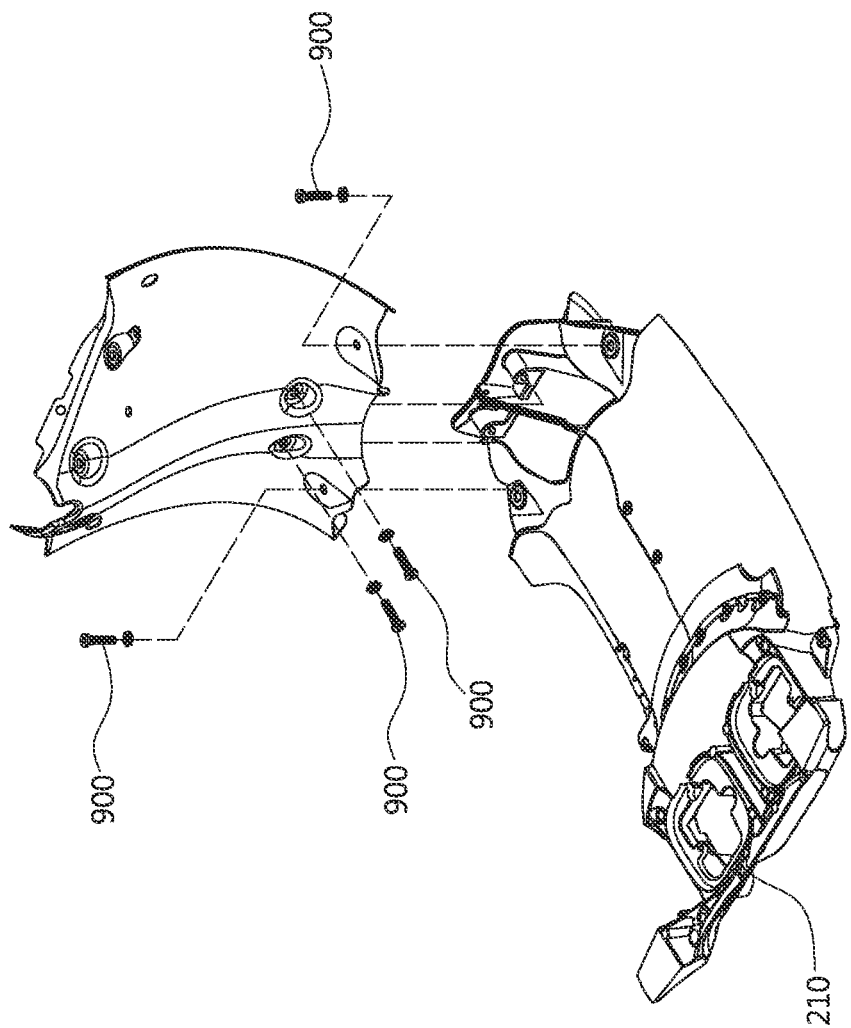

Further, in some embodiments of the present disclosure, the front part 220 and central part 210 of the upper portion 200 could be formed/manufactured separately. FIG. 8A and FIG. 8B are perspective views of an upper portion of the housing structure according to an exemplary embodiment of the present disclosure. Referring to FIG. 8A, shown are a front part 220 and a central part 210 of an upper part 200. In the present embodiment, the front part 220 and the central part 210 of the upper portion 200 are separately formed, and may be later secured or bonded together. For example, the front part 220 and central part 210 of the upper portion 200 may be bonded together by an adhesive, a rivet, a screw, or a combination thereof. FIG. 8B shows some parts of the front part 220 and central part 210 which may be fixed together by a screw 900. In some embodiments, the front part 220 and central part 210 of the upper portion 200 are connected by at least one blind rivet or pop rivet.

Figure 9B:
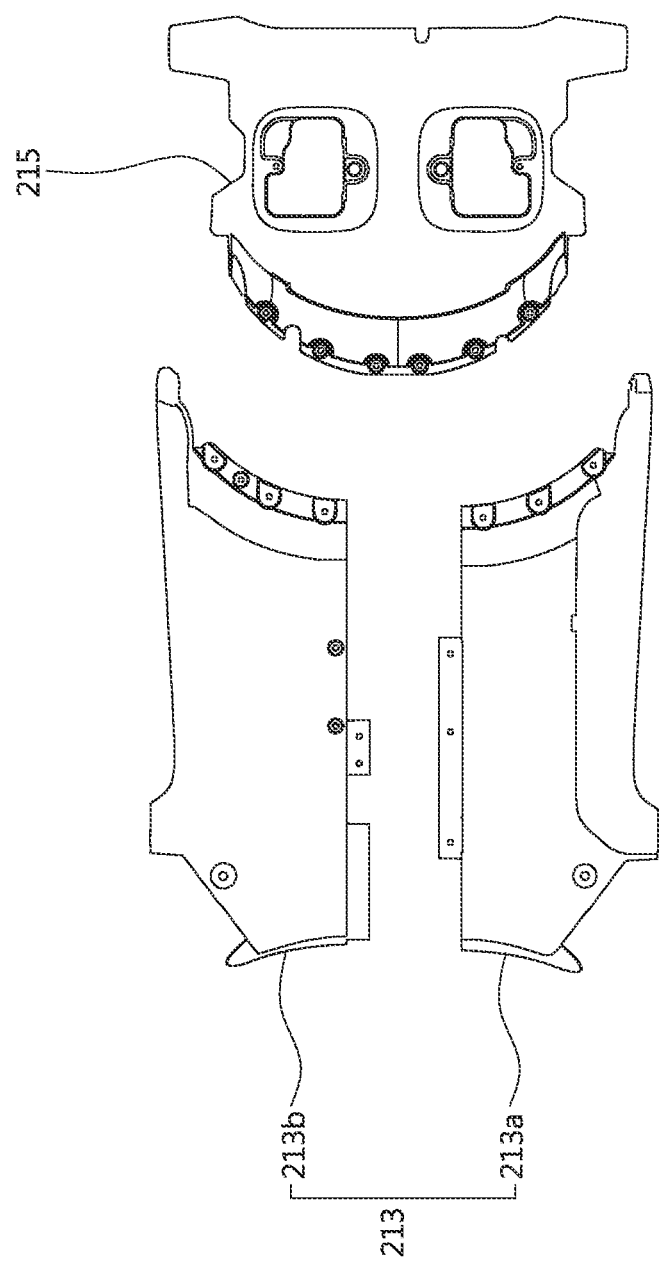
Figure 10A:
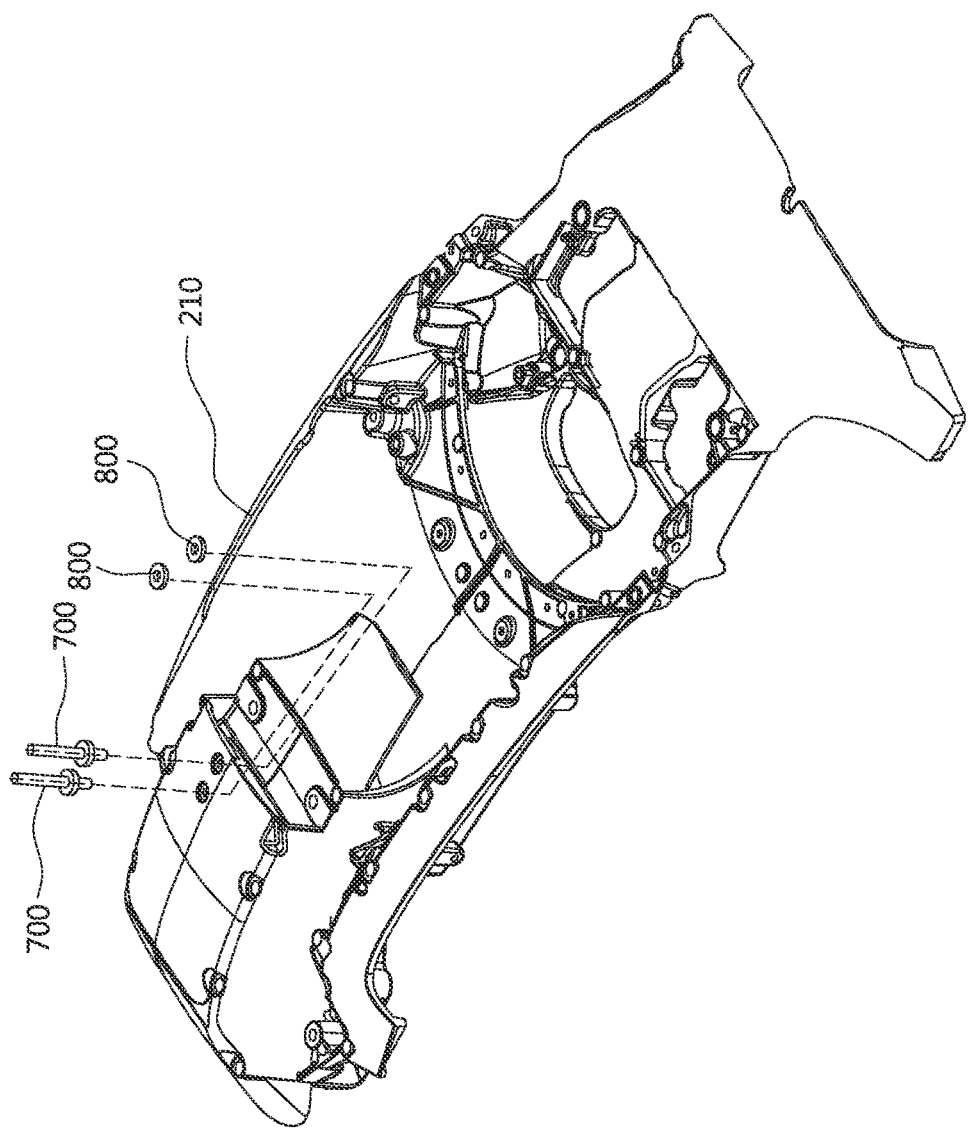
FIG. 10A is a schematic view illustrating the formation of a central part of an upper portion of the housing structure according to an exemplary embodiment of the present disclosure.
Figure 10B:
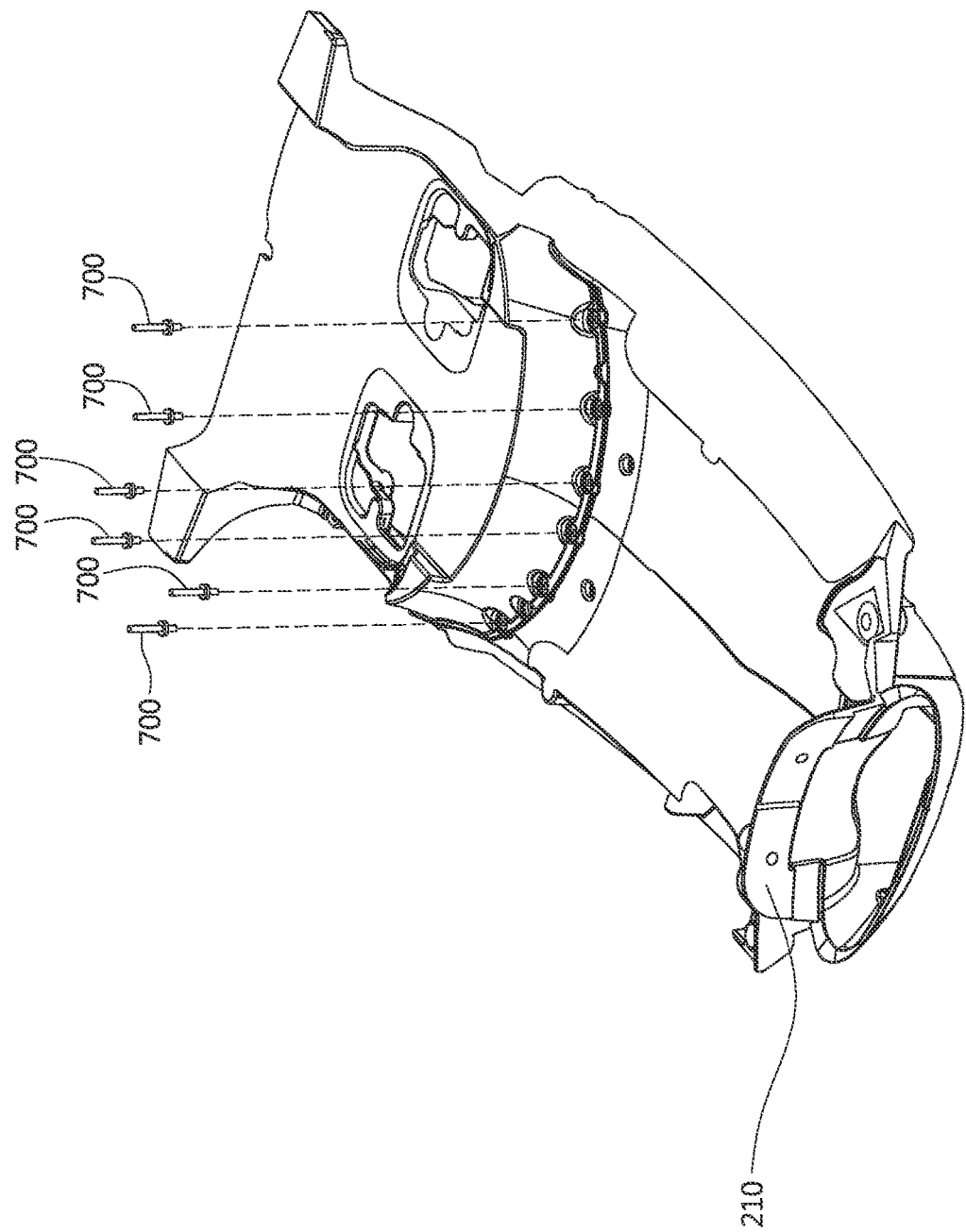
FIG. 10B is a schematic view illustrating the formation of a central part of an upper portion of the housing structure according to an exemplary embodiment of the present disclosure.
Figure 11A:
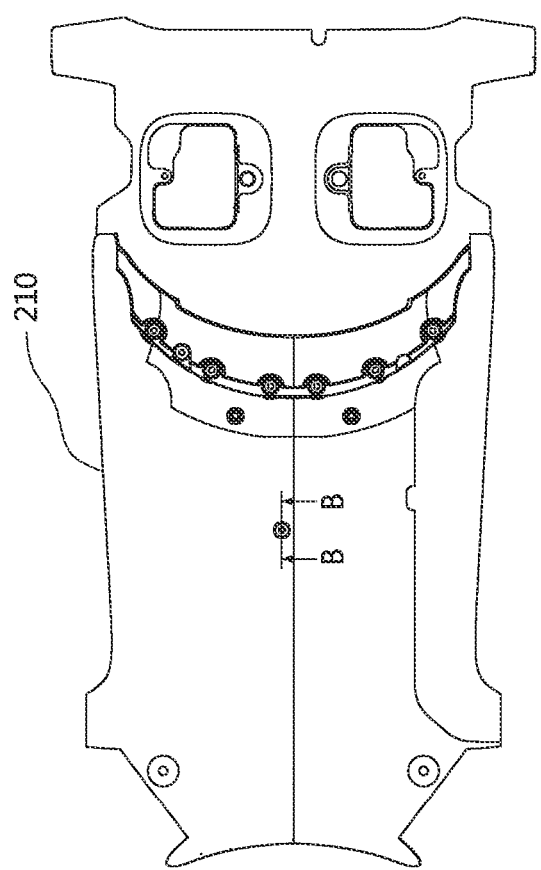
FIG. 11A a schematic view illustrating the formation of said central part according to an exemplary embodiment of the present disclosure.
Figure 11B:
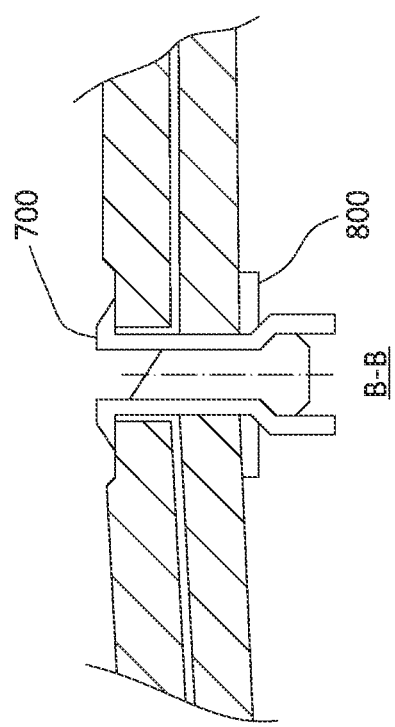
FIG. 11B is a cross-sectional view taken along line B-B of FIG. 11A.

In certain embodiments of the present disclosure, the central part 210 of the upper portion 200 could also be formed by bonding two or more pieces together. FIGS. 9A and 9B are schematic views illustrating the formation of a central part of an upper portion of the housing structure according to an exemplary embodiment of the present disclosure. Referring to FIGS. 9A and 9B, a central part 210 of an upper portion 200 may comprise a front piece 213 and a selectively-implemented rear piece 215 which may be used as a substrate of a battery accommodating space for an electric vehicle. The central part 210 may be formed by bonding the front piece 213 and the rear piece 215. In this embodiment, the front piece 213 further includes a first front piece 213a and a second front piece 213b, and the front piece 213 is formed by bonding the first and second front pieces 213a, 213b together. One or more bonding parts 216 for adhesive application may be disposed on appropriate locations on the first and second front pieces 213a, 213b and the rear piece 215, respectively, as shown in FIG. 9A. The first and second front pieces 213a, 213b and the rear piece 215 may first be bonded together by an adhesive applying to the bonding parts 216. Subsequently, the front piece 213 and the rear piece 215 may be further fixed by rivets, pop rivets or blind rivets, or screws through holes correspondingly formed on the first and second front pieces 213a, 213b and the rear piece 215, respectively. As shown in FIGS. 10A and 10B, rivets 700 and gaskets 800 are used to further secure the first and second front pieces 213a, 213b and the rear piece 215 together. At certain locations where a rivet is not applicable, a screw may be used for connection (not shown). FIGS. 11A and 11B are schematic views showing how the first and second front pieces of a front piece are connected by a rivet and a gasket according to an exemplary embodiment of the present disclosure. Referring to FIGS. 11A and 11B together with FIG. 9B, corresponding holes for receiving a rivet 700 may be formed on the first and second front pieces 213a, 213b, respectively. After properly aligning such hole on the first front piece 213a with a corresponding hole on the second front piece 213b, the rivet 700 can be fixed therethrough with the aid of a gasket 800. FIG. 11B is a cross-sectional view taken along line B-B of FIG. 11A, wherein the line B-B passes through the center of a pair of aligned holes. Referring to FIG. 11B, for installation of the rivet 700, the gasket 800 may be first temporarily fixed in position at one end of the aligned holes, then an outer part of the rivet 700, for receiving a central part of the rivet 700, is introduced from the other end of the aligned holes to pass through the aligned holes and the gasket 800 and fixed in the aligned holes, and lastly the central part of the rivet 700 is fixed into the outer part of the rivet 700. In some embodiments, the first and second front pieces 213a, 213b can have similar or different sizes. In some embodiments, the rear piece 215 may support a battery powering the vehicle.

According to the present disclosure, the separate formation of the front part 220 and the central part 210 and/or the separate formation of the front piece 213 and the rear piece 215 of the central part 210 can enhance the speed and quality of manufacture as well as lower the costs of manufacture, while maintain the same strength as the housing structure having integrally formed upper portion.

In one preferred embodiment of the present disclosure, the upper portion 200 and the lower portion 300 are made of a material selected from a group consisting of aluminum (Al) and alloys thereof so as to ensure a light weight, although they are not merely limited thereto. In other words, the upper portion 200 and the lower portion 300 may also be made of iron and an alloy thereof, or another metal and an alloy thereof.

The above disclosure is related to the detailed technical contents and inventive features thereof. People skilled in this field may proceed with a variety of modifications and replacements based on the disclosures and suggestions of the technology as described without departing from the characteristics thereof. Nevertheless, although such modifications and replacements are not fully disclosed in the above descriptions, they have substantially been covered in the following claims as appended.

I claim:

1. A housing structure, adapted to form a body of a vehicle, comprising:
   a lower portion, having:
      a plate-like central part having a front end and rear end, the front end being formed with a through hole configured to accommodate a handle bar of the vehicle, the rear end being configured to be coupled with a rear wheel of the vehicle; and
      a first bonding part formed on each of the lateral sides of the plate-like central part; and
   an upper portion, having:
      a central part having a second bonding part configured to be coupled with the first bonding part, the second bonding part being formed on each of the lateral sides of the central part; and
      a front part positioned adjacent to the central part and formed corresponding to the front end of the lower portion, the front part being formed with a through spaced configured to accommodate the handle bar of the vehicle;
   wherein the upper portion and the lower portion together provide structural support to the handle bar and the rear wheel.

2. The housing structure of claim 1, wherein by bonding the first bonding part of the lower portion with the second bonding part of the upper portion, a chamber is formed between the central parts of the lower and upper portions.

3. The housing structure of claim 1, wherein the lower and upper portions are made of a material selected from a group consisting of aluminum (Al) and alloys thereof.

4. The housing structure of claim 1, wherein the vehicle is a two-wheeled vehicle or a tricycle vehicle.

5. The housing structure of claim 4, wherein the lower portion further comprises a through hole, and a handle bar structure or a fork structure of the two-wheeled vehicle or the tricycle vehicle is adapted to pass through the through hole.

6. The housing structure of claim 1, wherein the front part is adapted to receive a handle bar structure of the vehicle.

7. The housing structure of claim 1, further comprises a rear part disposed opposite to the front part and adjacent to the second end of the central part of the upper portion, and the rear part is adapted to receive a seat cushion structure of the vehicle.

8. The housing structure of claim 1, wherein the front part and central part of the upper portion are formed separately.

9. The housing structure of claim 8, wherein the central part comprises a first front piece and a second front piece, wherein the first front piece and the second front piece are bonded together.

10. The housing structure of claim 9, wherein the central part comprises two front pieces, wherein the two front pieces are bonded together.

11. The housing structure of claim 10, wherein the central part further comprises a rear piece, wherein the two front pieces and the rear piece are bonded together.

12. The housing structure of claim 8, wherein the front part and central part of the upper portion are bonded together by an adhesive, a rivet, a screw, or a combination thereof.

13. The housing structure of claim 9, wherein the first front piece and the second front piece are bonded together by an adhesive, a rivet, a screw, or a combination thereof.

14. The housing structure of claim 1, wherein the rear end of the lower portion is formed with a battery recess configured to accommodate a battery.

15. The housing structure of claim 1, wherein the upper portion and the lower portion together provide structure support to the handle bar and the rear wheel without a tubular structure positioned between the handle bar and the rear wheel system.

16. The housing structure of claim 1, wherein the upper portion and the lower portion together enable a force to be directly transferred from the rear wheel to the handle bar.

* * * * *